US012562290B2

(12) United States Patent
Dory

(10) Patent No.: US 12,562,290 B2
(45) Date of Patent: Feb. 24, 2026

(54) PROCESS FOR AIDING THE DETECTION OF MIGRATING BODIES WITHIN A FUEL ASSEMBLY

(71) Applicant: Electricite de France, Paris (FR)

(72) Inventor: Fabien Dory, Cachan (FR)

(73) Assignee: Electricite de France (FR)

( * ) Notice: Subject to any disclaimer, the term of this patent is extended or adjusted under 35 U.S.C. 154(b) by 99 days.

(21) Appl. No.: 18/523,162

(22) Filed: Nov. 29, 2023

(65) Prior Publication Data

US 2024/0177877 A1     May 30, 2024

(30) Foreign Application Priority Data

Nov. 29, 2022    (FR) ...................................... 2212506

(51) Int. Cl.
| | |
|---|---|
| *G21C 17/06* | (2006.01) |
| *G06T 7/00* | (2017.01) |
| *G06V 20/05* | (2022.01) |
| *G21C 3/32* | (2006.01) |

(52) U.S. Cl.
CPC ............ *G21C 17/06* (2013.01); *G06T 7/0008* (2013.01); *G06T 2207/20081* (2013.01); *G06T 2207/20084* (2013.01); *G06V 20/05* (2022.01); *G21C 3/3206* (2013.01)

(58) Field of Classification Search
CPC ...... G21C 17/06; G21C 3/3206; G21C 3/334; G21C 17/00; G06T 7/0008; G06T 2207/20081; G06T 2207/20084; G06V 20/05; G06V 10/82; G06N 3/0464
See application file for complete search history.

(56) References Cited

U.S. PATENT DOCUMENTS

| | | | |
|---|---|---|---|
| 2013/0114878 A1* | 5/2013 | Scheid | G06T 7/001 |
| | | | 382/141 |
| 2016/0341591 A1* | 11/2016 | Cipullo | G01B 11/0608 |
| 2019/0301996 A1* | 10/2019 | Kim | G01N 15/1434 |
| 2020/0184216 A1* | 6/2020 | Liu | G06F 18/2178 |
| 2021/0210231 A1* | 7/2021 | Sukeda | G21C 17/022 |

FOREIGN PATENT DOCUMENTS

| | | |
|---|---|---|
| CN | 109243638 A | 1/2019 |
| FR | 3118270 A1 | 6/2022 |
| JP | 2013160738 A | 8/2013 |
| WO | 2021/026649 A1 | 2/2021 |

OTHER PUBLICATIONS

Search Report for Application No. FR 2212506 completed Jun. 15, 2023. 2 pgs. (see p. 1. categorizing the cited references).

* cited by examiner

*Primary Examiner* — Daryl C Pope
(74) *Attorney, Agent, or Firm* — Lerner David LLP

(57) ABSTRACT

The invention relates to a process for aiding the detection of migrating bodies within a fuel assembly of a nuclear power plant and more particularly on the anti-debris grid of the lower end piece of said assembly, during which at least one camera is controlled in the direction of said assembly and the stream of images recorded by said at least one camera is directed towards a man-machine interface which comprises at least one screen allowing a first operator to view said stream of video images, characterized in that it comprises a first step of detecting, using an image recognition algorithm, said migrating bodies, as well as at least a second step of alerting said operator if said algorithm has detected the potential presence of at least one migrating body.

8 Claims, 4 Drawing Sheets

[Fig. 1]                PRIOR ART
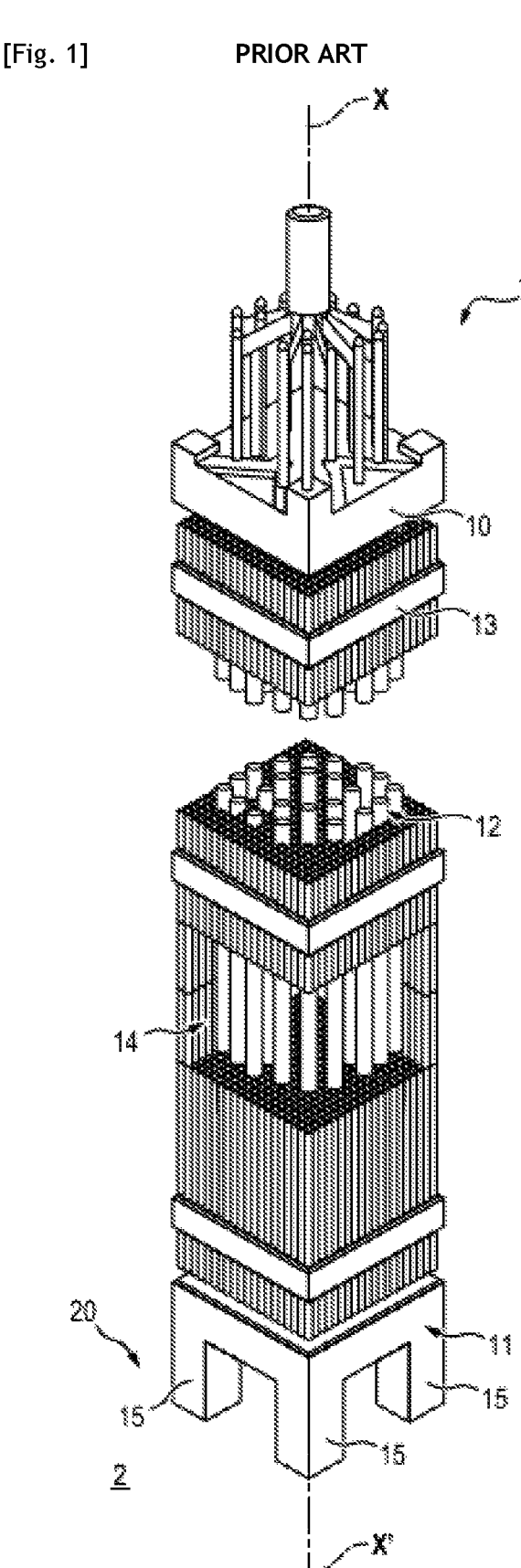

[Fig. 2]                    PRIOR ART
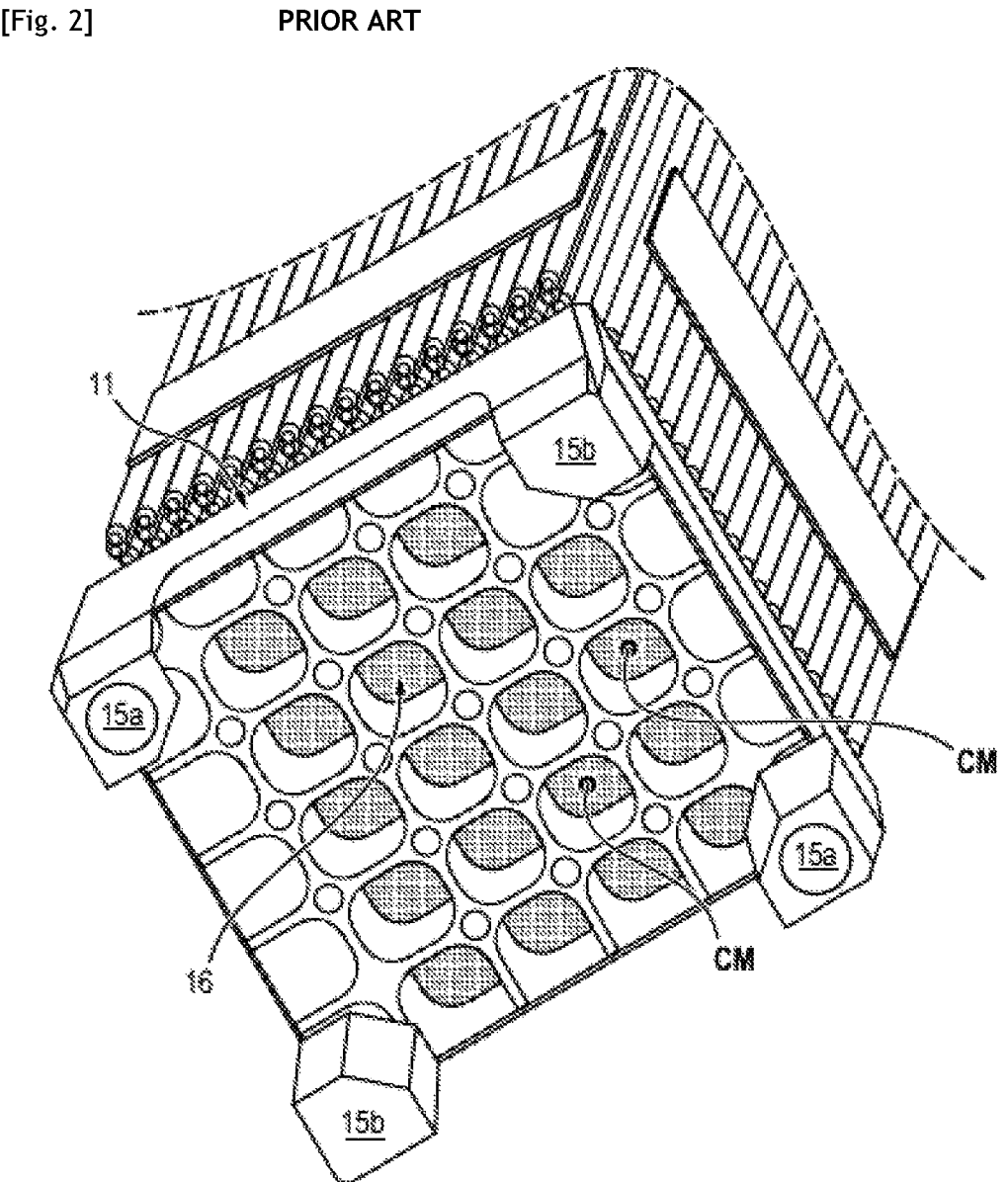

[Fig. 3]
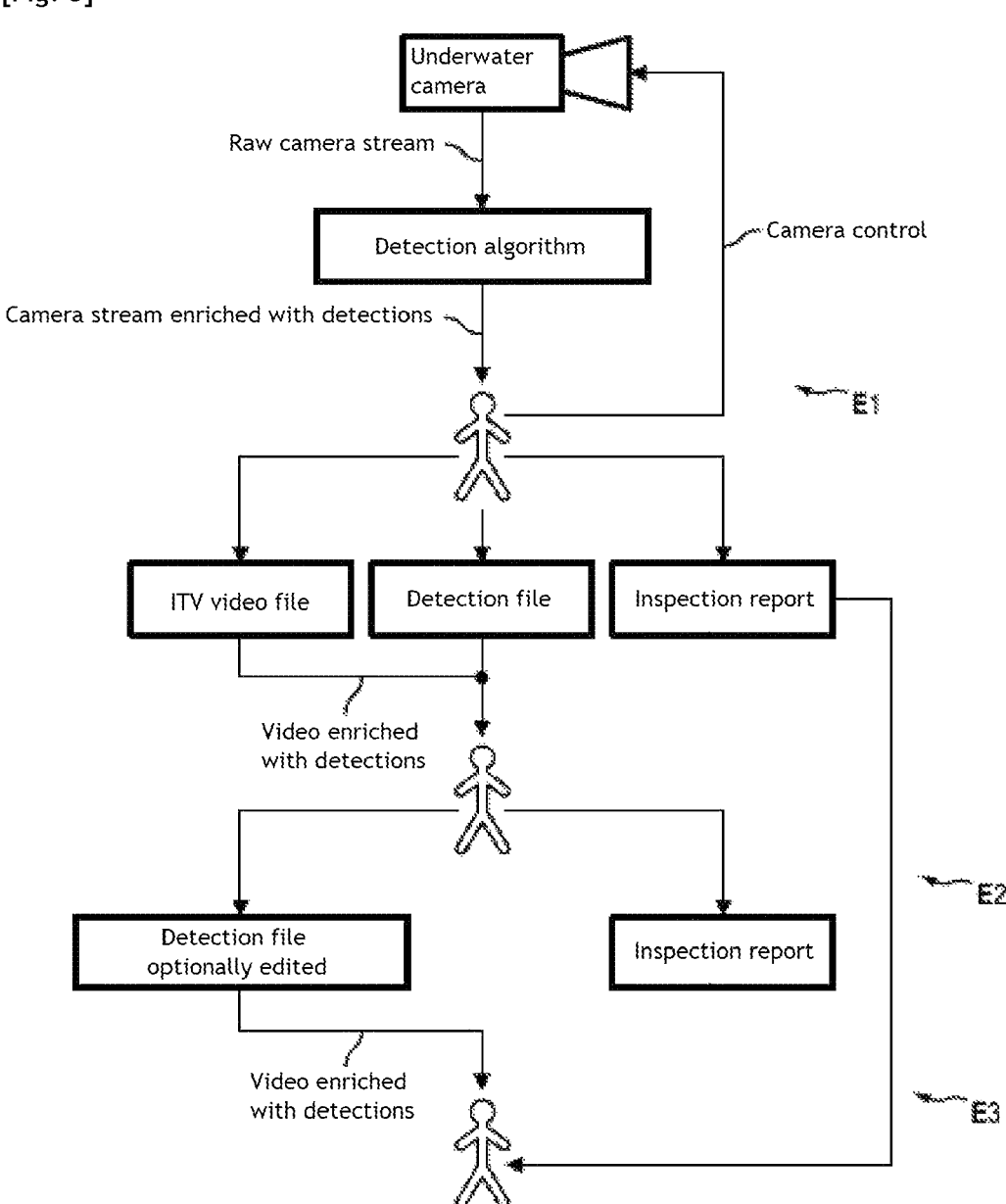

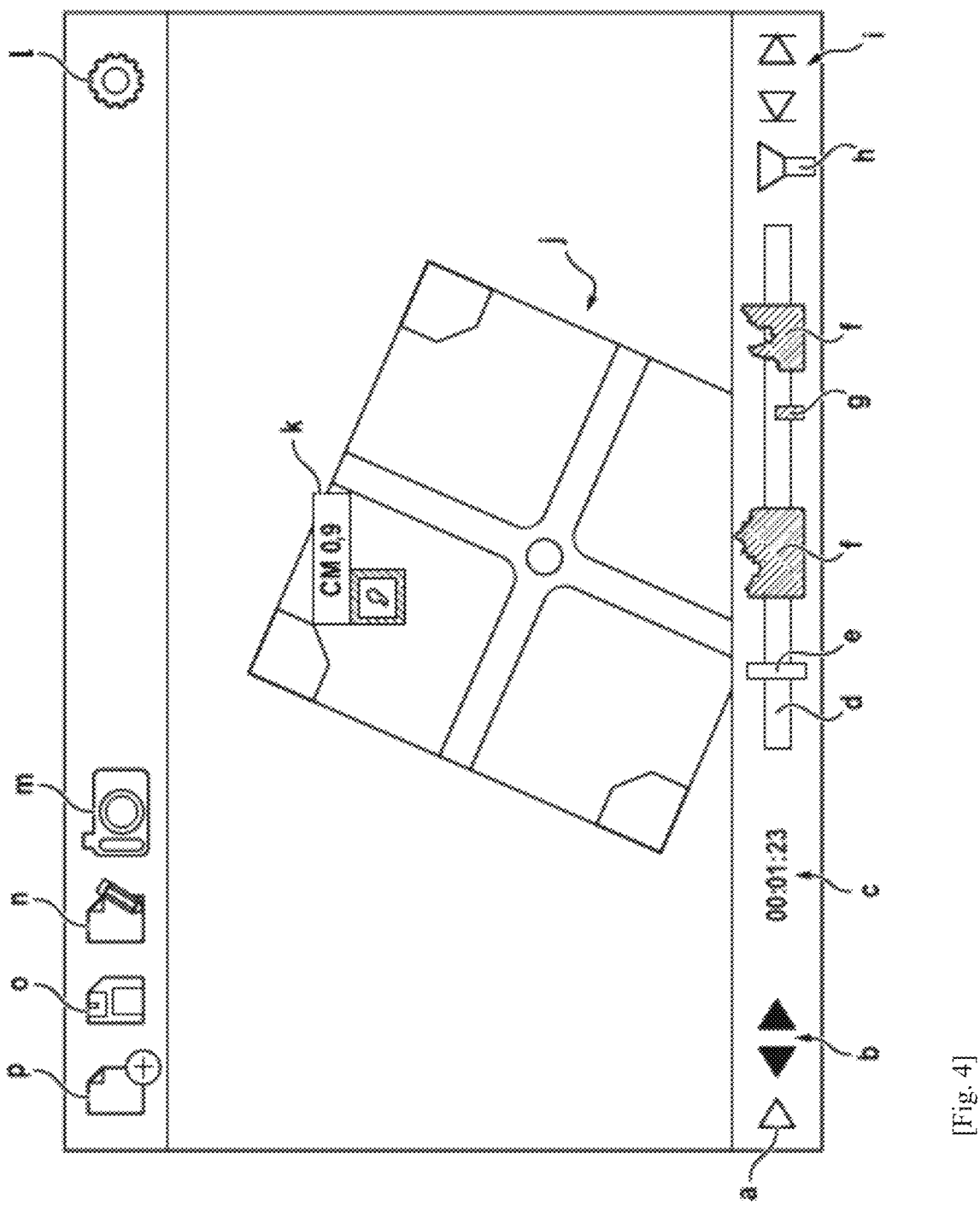
[Fig. 4]

PROCESS FOR AIDING THE DETECTION OF MIGRATING BODIES WITHIN A FUEL ASSEMBLY

CROSS-REFERENCE TO RELATED APPLICATIONS

This application claims priority from French application number 2212506, filed Nov. 29, 2022, the disclosure of which is hereby incorporated herein by reference.

GENERAL TECHNICAL FIELD

The present invention lies in the field of detection of migrating bodies at the base of fuel assemblies within nuclear power plants.

It is more precisely in the context of underwater television inspections of fuel assemblies.

CONTEXT OF THE INVENTION AND STATE OF THE ART

Appended FIG. 1 shows a fuel assembly 1 among the plurality of assemblies constituting the core 2 of a nuclear reactor.

It includes two upper 10 and lower 11 end pieces between which are located the structure of the assembly (guide tubes 12 and grids 13), as well as fuel rods 14.

The fuel assembly 1 rests on the lower plate of the core 2 by the lower end piece 11.

When installing such assemblies in the core, it is necessary that their positioning in their respective dedicated location 20 gives them a stable hold, in a vertical position with reference to the axis X-X' of the largest dimension of the assembly 1.

The fuel assembly rests on the lower core plate 2 on four support points, which constitute feet 15a and 15b visible in appended FIG. 2.

The two feet 15b are perfectly flat, while the other two are provided with a bore allowing good positioning of the end piece 11 when installing the core assembly 1.

The stability of the assembly is obtained when the lower end piece 11 of the fuel assembly 1 rests on these four feet 15a and 15b, without interposing between these support points 15a and 15b and the bottom of the core 2 any foreign body or any roughness.

It will be noted that FIG. 2 also shows the anti-debris grid 16 of the lower end piece 11 allowing to filter foreign bodies in order to prevent them from rising into the assembly, between the fuel rods.

During the storage of fuel assemblies 1, it may happen that foreign bodies, also called migrating bodies CM, are lodged and fixed under the feet 15a and 15b of the lower end piece 11. These bodies must be extracted before the introduction of the assemblies in the reactor. Otherwise, they could compromise its stability.

In document FR-A-3118270 in the name of the present applicant, a cleaning installation is described which allows to get rid of migrating bodies which may have lodged under the feet of the lower end piece.

In the context of the present invention, the term "foreign body" or "migrating body" CM means any object of any material. They can have varied origins that are typically found in any industrial site and be endogenous or exogenous thereto.

In a non-limiting manner, it may be debris resulting from welding or machining operations. It can also be small components such as for example screws, bolts, washers, springs, metal shavings, etc., which can migrate and attach to the anti-debris grid 16.

FIG. 2 illustrates an example of a migrating body CM stopped by the anti-debris grid 16. These migrating bodies CM are lodged under or on the anti-debris grid 16 where they are blocked depending on the case.

In a pressurized water nuclear power plant, the nuclear fuel which produces the heat is contained in zirconium alloy tubes which are called fuel rods. These fuel rods are grouped into bundles of 264 rods, held together by a framework closed by end pieces. The whole, framework+rods, forms a "fuel assembly". The core of a reactor of a nuclear power plant is made up of 157, 193 or 205 (241 on an EPR) of these fuel assemblies, in particular and in a non-limiting manner in the case of French nuclear power plants such as those held by the present applicant.

The lower end piece 11 of a fuel assembly 1 rests on the lower plate of the core 2, pierced with holes to allow the circulation of the cooling water, in the vertical direction, from bottom to top. This cooling water, by circulating in the primary circuit, can take on debris that may be present, namely migrating bodies CM, as explained above.

During a shutdown of a nuclear power plant during which the nuclear reactor core is unloaded, the assemblies are extracted to be inspected under water, from all angles, using cameras, looking for various defects, then returned in the core for the next cycle or are placed in a cooling pool. During these television inspections (abbreviated ITV), the anti-debris grid 16 is particularly carefully inspected in search of these possible migrating bodies CM.

This inspection is necessary because a migrating body present on the grid 16 can have several impacts if the assembly 1 is reloaded as it is in the core 2.

Indeed, by blocking part of the filter constituted by the anti-debris grid 16, it modifies the circulation of the cooling water, can induce vibrations/turbulence and lead to a "fretting" phenomenon, that is to say friction of the rods 14 on the skeleton of the assembly 1, thus causing premature wear of the latter.

Moreover, if a migrating body CM is still present on the anti-debris grid 16 during reloading, it may possibly, during reloading manipulations, pass through the anti-debris grid and end up between rods 14.

If it is a metal body, there is a risk of piercing the rod sheath, so that the core is no longer clean.

In addition, during reloading and in particular the arrival of the lower end piece 11 of the assembly 1 on the lower core plate 2, a migrating body still present can apply a deformation to this assembly.

Potential impacts on the rods 14 can damage them, or even lead to a rupture of the sheath which constitutes the first of the three safety barriers which prevent the dispersion of radioactive products contained in the fuel.

In addition, the possible deformation of the assembly 1 due to a migrating body CM during reloading may make the future extraction of this assembly from the core 2 difficult.

It is therefore very important, during television inspections (abbreviated ITV) of the anti-debris grid 16, that no migrating body CM escapes the inspection of the operators dedicated to this task.

However, such an inspection mission is difficult because it requires high vigilance on the part of operators, over a long period of time. It causes significant visual and attentional fatigue, because it implements very repetitive, monotonous actions, during which the events to be detected are very rare (of the order of one migrating body CM for fifty assemblies inspected, which represents approximately 2 h 30 of video to view).

The consequence is that migrating bodies CM are sometimes not detected by the operator, despite the fact that in the current protocol, each video is inspected individually by several operators, successively, according to the organization specific to the plant.

This current television inspection technique is unassisted, so that the video stream returned by the inspection camera is raw, a human operator being responsible for detecting migrating bodies CM from the video stream.

An example of an inspection organization is described below.

Initially, a first operator is responsible for a "live" inspection, while images are taken using a camera at the bottom of the pool. The operator brings the fuel assembly 1 above the camera, then zooms in on the legs 15 and the anti-debris grid 16 that he inspects in detail (between 2 and 3 minutes per assembly).

He notes, in the form of a report, suspicions of migrating bodies CM and transmits the raw video (without the detected migrating body information) to a second operator who re-examines the entire video in search of migrating bodies CM and also generates his report.

Finally, the third operator re-examines the video, assisted by the two reports from the two previous operators, and makes a final decision (presence or not of a migrating body to be extracted).

In practice, there is no specific training on this subject, so that the operators learn through companionship and experience of real-life cases.

Documents JP2013160738, WO2021/026649 and CN109243638 illustrate the technical background of the invention.

The present invention aims at making the operation described above more reliable by overcoming the lack of vigilance of the operators, via assistance in the detection of these migrating bodies.

PRESENTATION OF THE INVENTION

Thus, the present invention relates to a process for aiding the detection of migrating bodies within a fuel assembly of a nuclear power plant and more particularly on the anti-debris grid of the lower end piece of said assembly, during which at least one camera is controlled in the direction of said assembly and the stream of images recorded by said at least one camera is directed towards a man-machine interface which comprises at least one screen allowing a first operator to view said stream of video images, characterized in that it comprises a first step of detecting, using an image recognition algorithm, said migrating bodies, as well as at least a second step of alerting said operator if said algorithm has detected the potential presence of at least one migrating body.

Thanks to the invention, said operator is provided, somehow, with a "virtual colleague" who allows him to indicate the migrating bodies that he detects. It is understood that this makes the operator's task easier, avoids a loss of vigilance and contributes to ensuring that no migrating body escapes surveillance.

According to other advantageous and non-limiting features of this process, taken alone or according to a technically compatible combination of at least two of them:

said second alert step comprises the triggering of an audible alert and/or a visual alert on said screen, of the location where said migrating body is potentially placed and/or the automatic generation of an inspection report;

when said algorithm has detected the potential presence of at least one migrating body, the corresponding video file as well as the file(s) of detection(s) carried out by said algorithm are stored and it is (they are) addressed to a second operator with a temporal indication, in said video file, of the instant(s) at which one or more migrating body (bodies) was (were) potentially detected, this second operator validating the presence or lack of presence of at least one migrating body;

said detection file(s) are transmitted to a third operator who definitively validates the presence or lack of presence of at least one migrating body;

it comprises an automatic learning step for detecting migrating bodies when the second operator, respectively the third operator, has validated the lack of presence of a migrating body;

use is made of an image recognition software of the "convolutional neural network" type, which is trained on a learning base made up of archives of videos of migrating bodies, which base is potentially enriched each time said recognition software commits a detection error such as a "false positive" or a "false negative", this error having been validated by the second and/or the third operator;

said temporal indication has the shape of at least one bar displayed on the timeline of the video.

Throughout the present application, including the claims, the expressions "false positive" and a "false negative" mean respectively the detection by the software of something which is not a migrating body, respectively an absence of detection of a real migrating body, not seen by the software, even though it is present in the video.

DESCRIPTION OF THE FIGURES

Other features and advantages of the invention will appear from the description which will now be made, with reference to the appended drawings, which represent, in an indicative but non-limiting manner, different possible embodiments.

In these drawings:

FIG. 1 is a perspective view of a fuel assembly in accordance with the prior art and commented above;

FIG. 2 is a simplified perspective and low-angle view of the lower face of the lower end piece of the assembly of FIG. 1;

FIG. 3 is a flowchart intended to illustrate the implementation of the process according to the invention;

FIG. 4 is a front and schematic view of a man-machine interface screen used for the implementation of the invention, and more particularly intended to illustrate the way in which the information visible on this screen is presented.

DETAILED DESCRIPTION OF THE INVENTION

The present invention essentially relates to a process for detecting migrating bodies CM on the anti-debris grid 16 of a lower end piece 11 of a fuel assembly 1, which is implemented by a program which processes data from television inspection (hereinafter ITV) images.

Overall, this process allows to analyze in real time and/or in non-real time, the video stream from a camera which is controlled in the direction of the fuel assembly 1 to detect migrating bodies CM and present them to the operators in charge in different ways.

The process can be applied at each of the inspection steps. By the expression "a camera controlled in the direction", it is meant that said camera is fixed and that it zooms and implements rotations directed towards the assembly.

In the case of real-time use by the operator handling the camera, the process generates an "alert", which is in particular visual on the video stream using a detection algorithm to indicate that it has detected "something" at "a particular place", so that the operator pays attention to it and possibly decides to examine this area more specifically. It is also possible to generate another type of alert, such as an audio alert.

It can also allow the automatic generation of an inspection report.

At the end of this step, the raw inspection video, a file which gathers the detections made by the algorithm, and the operator's inspection report are then available.

This corresponds to step E1 shown in appended FIG. 3.

In the case of non-real time uses, for example for a second immediate step (as soon as the first operator has completed his inspection) of independent inspection by a second operator, as is the case in several nuclear power plants, and for the last step of re-examination of the videos to remove doubt and the decision to intervene or not to remove the CM, the video file of the inspection accompanied by the file of detections generated in the previous step are provided and are used by the process to have the same assistance as to the first operator, but additionally indicating, in the time progress bar of the video, the instants at which migrating bodies are suspected of being present by the program. This corresponds to step E2 of FIG. 3.

Finally, a third and final operator, responsible for a final viewing with the reports of the first two operators as support, and with the objective of deciding on the actions to be carried out, will also be able to benefit from the detections of the algorithm in his review, in particular from the functionality which allows to go directly to the instants in the video where the migrating body is seen. This corresponds to step E3 of FIG. 3.

The "doubt removal" by the latter operator is on the critical path to unit shutdown. The critical path is the entry into a retro-calendar counted from a previously fixed date of a future event—for example the divergence of the reactor—so that any delay before this event will lead to its shift in time, with penalizing consequences for operations (production failure, etc.).

It appears from the above that the present process thus allows to considerably reduce the video analysis time. Indeed, taking video images for an assembly 1 lasts on average 3 minutes (more precisely between 2 and 5 minutes), to be multiplied by 157 to 205 assemblies (around 8 hours for a unit shutdown). Furthermore, the present process allows operators to focus directly on sections of the video where migrating bodies CM are suspected, without having to scan the entire video to search for them.

Algorithm

The process according to the invention is based on an algorithm for image recognition and detection of migrating bodies CM which can consist of a version of "Yolov3" (convolutional neural network type detection algorithm), which is trained on a specific learning base made up from archives of videos of migrating bodies.

The learning base is created iteratively and following a specific methodology to minimize human labeling effort.

Thus, for example, the base can be enriched each time the lack of presence of at least one migrating body CM has been validated by the second and/or the third operator (in other words when the operator has validated that it was a "false positive"), and each time that a CM was not automatically detected. In this way, the algorithm somehow learns from its mistakes. However, it is also possible to enrich the database each time the presence of a migrating body is validated.

Certain modifications can be made to the algorithm to take advantage of the specificities of video images of fuel assemblies compared to natural images, in particular at the geometric transformations of the data augmentation which includes up-down symmetries, left-right symmetries, isotropic scale changes (contraction/stretching) and rotations of 90°, 180° and 270°.

Yolov3 basic data augmentation uses only a left/right mirror, anisotropic scale changes (contractions/stretches) and no rotations.

As input to the neural network, provision is made of an image of dimension $416 \times 416$ pixels$^2$, and if the image is of a different dimension, it must be resized.

As output, a list of detections is retrieved.

Advantageously, each detection is characterized by a position (in the form of the four coordinates of an "axis aligned" bounding box framing the detection) and a confidence level (real number between 0.10 and 1.00) which reflects how the algorithm estimates the reliability of the detection.

Generally, the higher this number, the higher the probability that it is a true positive (that is to say a true detection).

Video Playback Tool Integrating or Interfacing with the Detection Algorithm

The man-machine interface offered to operators to assist them in the task of searching for CMs during ITV can take the form of a video player in which the proposals of the detection algorithm are presented.

This video player can, for example, have three different possible operating modes in its link with the detection algorithm (this choice configurable via a configuration file):

A. The detection algorithm can be embedded in the video player. In this case, the detection neural network is provided to the tool in the form of a file in "ONNX" format (operated via "ML.Net", that is to say the framework of open source machine learning of the Microsoft Company), and the tool configuration file references this file.

In this configuration, the video playback tool "feeds" the neural network with successive images of the video (or the stream from the camera), resizing them to 416×416, and recovers the detections to display them.

B. The detection algorithm can be remote and run in/on a server.

In this case, the tool configuration file references the server to which it must connect. In this configuration, the video playback tool sends successive images to the server, and retrieves the detections to display them.

C. The tool can be used to simply replay detections already made previously, in which case it reads as input the "detection file" in text format which lists all the detections associated with the video to display them.

The association between the video and the associated detection file to be opened is automatic and is done by name. When a video is opened, if a text file with the same name as the video (but in ".txt" format) is present, then the tool gives the choice between using this existing file or redoing a detection session.

The algorithm detections can be presented to the user in two ways, in two places, for example:

1. on the image of the video of grid 16 of fuel assembly 1: a square surrounds each detection, accompanied by the word "migrating body" CM and an audible alert signals the detection;
2. on the time progress bar of the video, each detection is marked by a vertical bar, at the location of the time progress bar which corresponds to the instant of detection in the video, in order to easily identify the detections to be able to get there, in particular the moments/intervals in which the detections are concentrated.

In the aforementioned modes A and B, when the detection algorithm has finished processing a video (or a camera session), it offers to archive the list of detections via a text file, named identically to the video, and placed in the same location (same directory). If such a file already existed, the old one is backed up and listed in a backup subdirectory.

FIG. 4 shows how suspected migrating bodies CM can be presented to operators, on a computer screen.

A certain number of interface elements, visible in FIG. 1, facilitate the search and analysis of migrating bodies.

These interface elements are as follows:

a. "Play/pause" button.
b. Buttons allowing to move forward in the video or go back a specific length of time. The duration in question is indicated in the configuration file.
c. Time indicator in the video (the current time and the total time are displayed in the case where a video is replayed, but only the current time is displayed in direct mode connected to the camera).
d. Time progress bar with, to its right, a speed multiplier factor allowing accelerated video playback.
e. Time position indicator in the video, which can be manipulated.
f. Groups of detections (one detection=a vertical bar, a group of contiguous bars=a group of detections).
g. An isolated detection (typical aspect of a "false positive").
h. Filter which allows to filter the positions to be displayed according to their confidence level.
i. Navigation from group of detections to group of detections.
j. Video display area.
k. Indication of detection of migrating body CM by the process, in the form of an "enclosing rectangle"+ mention "CM"+confidence level of the detection.
l. Access to settings (to fill the configuration file).
m. Shot request (for addition to ITV report).
n. Opening of the ITV report.
o. Backup of detections after editing by the user (who can add/delete detections).
p. Opening of either a file for review, or the camera stream.

The concept of "group of detections", mentioned above, is explained below.

In the video, the instants when a migrating body is visible on the screen are generally grouped in blocks (for example the CM is visible from t=10.2 s to t=15.04 s then not at all, then from t=121 s to t=125.3 s).

In the time progress bar d, each detection is associated with a vertical bar whose height corresponds to the confidence index of the detection.

A "group of detections" therefore appears as a set of such contiguous bars, therefore as a single object.

The left and right arrows i allow to navigate directly from group of detections to group of detections.

In the configuration file, two parameters related to this concept are advantageously indicated:

1. The minimum number of detections for a "group of detections" to be considered (this is a way of filtering isolated detections, which are most of the time false positives);
2. A tolerance threshold for non-detections, in the form of a tolerable number of contiguous images "without detection" (which is worth two by default, that is to say that groups must be changed only if there are three or more contiguous images without detection).

A group of detections is therefore a "same detection" (that is to say a priori of the same object), but which lasts over time. Navigating from one to the other allows very rapid visualization, for a video, of the different "candidate migrating bodies".

The advantage of displaying the vertical detection bars in the time progress bar is that this visual representation takes on very different aspects in the event of the presence of migrating bodies (contiguous groups of detections with a high average level of confidence) or in the event of presence of false positives (isolated detections most often of low level of confidence).

With practice, simply viewing the time progress bar equipped with these bars allows to have a good idea of whether the video contains a migrating body or whether the detections displayed will likely be false positives.

Filtering detections allows to remove the presentation of detections whose associated confidence level is lower than the filter value. The level can thus be adapted to each video independently. It allows false positives to be removed, and to visualize in real time how this modifies the appearance of the time progress bar d equipped with the vertical bars associated with detections f and g.

Generating a report, via the buttons m and n, allows the operator to take screenshots n at different key instants, then generate a report m. This report lists the "valid" detections according to the operator (moments in the video+screenshot).

It may be transmitted to assist the final doubt removal step and may be used for archiving.

Other Features that can Increase the Efficiency of the Process

The video can be played in fast motion. In this mode, the video slows down to normal speed in areas where the algorithm has made detections.

To ensure real time on machines that do not have enough power, the tool does not send all the images of the video (or the camera stream) into the detection algorithm but only a certain ratio, at, namely the one which allows real time to be preserved.

In the case where a video file (and not a camera stream) is processed, it is possible to move in the video during processing, and the processing will jump directly to the current instant.

If this is performed several times, there will be parts of the video that have already been processed and parts that have not yet been processed, at different places in the video. To show this state to the user, the time progress bar is colored green (or another color of choice) for the instants that have been processed by the algorithm, and remains white (or other color) for the instants remaining to be processed.

The progress of the green zone is visualized in real time (similar to online videos, which show the user which areas of the video have been loaded and which have not yet been loaded).

Two different modes for resizing the video to the 416×416 format that the network takes as input can be offered.

These videos are in rectangular format in landscape mode (width>height), but some include vertical black strips on the left and right, the central area of interest being almost square.

The user therefore has the choice, to reduce the image to 416×416, to reduce the video so that just the central square is taken, which is then reduced to 416×416, or to fit the entire video into a square of 416×416 (the length is reduced to 416, and the width is reduced by the same factor). This choice between the two reduction modes is entered in the configuration file via the parameter button l.

Finally, for the accelerated analysis of an archived campaign or a file comprising numerous videos, it is possible to offer "batch" processing which generates for each video, in addition to the detection files, a "signature" image which should allow videos that include migrating bodies to be seen quickly and as a priority.

The principle is as follows.

For each video, once its algorithmic processing is completed, the video tool is positioned at the moment of best detection (in terms of confidence level) of the largest continuous detection group (when there are groups of detections), then takes a screenshot. This screenshot is named like the video, with a prefix of a 6-digit counter, in the format 000000_, which counts the total number of detections in this video.

All screenshots thus generated are placed in the same directory. Then, to view the result, it is sufficient to simply classify these image files in reverse alphabetical order (in the "Windows" (registered trademark) file explorer), then browse them in slideshow mode.

The videos with the most detections will appear first in this sequence. One second of viewing by the operator is enough per screenshot, because in this screenshot the framed suspected migrating body, and the appearance of the time progress bar equipped with detection indicators can both be seen.

This image most often allows to capture an instant where the CM is present (if it is a video which presents a real CM), and in the case where the instant captured does not show a CM, the appearance of the time progress bar gives a very good idea of the presence of CM in the video.

It is by applying this last functionality that it was possible, in less than a minute of human processing (viewing these images in reverse alphabetical order), to detect two migrating bodies (on two different videos) that had been detected by none of the three operators during a previous ITV campaign.

Characterization of Performances:

Cases of non-detection are explainable. These are new types of CM, on which the algorithm had not been trained.

It is therefore sufficient to just retrain the algorithm with these inputs to improve performance. Thus the detection rate on the types of CM already seen by the algorithm approaches 100%.

False positives are very few (some entire videos do not have a single detection, over three minutes of video, or 4500 images).

The average false positive rate "per image", measured on a reference test set, is around 2%. Which means that over a minute of video (1500 images), there will be 30 false "point" detections (that is to say those that flash for a 25th of a second). Over a complete test campaign, more than half of the 3-minute videos contain less than 15 false detections (less than 0.3% false positives). In addition, when a false positive appears in a video, it is most often very occasional.

Generally, it appears as an isolated flash of ½₅th of a second and does not attract attention.

However, there are several avenues to further significantly reduce these false positives. The first is the filtering of isolated detections (at a location in the assembly where there are no or too few other detections in the video).

It is also possible to eliminate the "typical" false positives that appear because of new elements that look like CMs but are not (such as locally very lightened rods, or certain water reflections) thanks to a retraining including them.

Variant Embodiments

Image Mode:

It is possible to offer a mode in which it is also possible to process images in addition to videos.

In this mode, it is possible to either open a single image for immediate analysis (or drag and drop the image from the "Windows" explorer (registered trademark) into the window of the tool), or indicate a directory containing several images.

In the case of a single image, the time navigation tools and the time progress bar are no longer of interest.

In the case of an image directory, these elements are recycled. The navigation arrows b allow to move from image to image, like in a slideshow, and the navigation arrows i, which allowed to move from detection group to detection group, here allow to move from one image including a detection to another image including a detection.

The display of the vertical bars f and g illustrating the detections is retained and the filter h is also functional.

Monitoring the Screws as Marks:

The lower end piece 11 of fuel assembly 1 generally includes twenty-four very characteristic screws which are placed in the same place, regardless of the supplier of the assembly.

These screws constitute marks that are easy to detect with the already existing algorithm (indeed, it is sufficient to teach the algorithm to detect the screws in addition to the CMs). Their respective gaps and positions being known, the screws allow, for a very low algorithmic cost, to estimate the installation of the fuel assembly 1 (precise evaluation of the position/orientation, at each instant, of the fuel assembly relative to the camera).

Monitoring the screws thus allows the creation of a mark relating to the assembly 1 in which it becomes possible to carry out mapping and metrology of the CMs.

Thus we can give:

1. An estimate of the size of the CM.
2. An estimate of the coverage of the anti-debris assembly grid 16, during the ITV (by estimation of the areas viewed), because on certain archive videos, it is seen that certain areas are treated very quickly or even forgotten.
3. Determine the start and end of the debris grid 16 analysis in an ITV video (which sometimes comprises sections other than just the debris grid examination phase).
4. Know the precise position of each detection on the anti-debris assembly grid 16.

The aforementioned functionality 2 in turn leads to several interesting possibilities:

1. A possible almost complete automation which, with a video, associates a schematic view of the assembly grid on which is shown, where applicable, the location of the CM(s) detected a large number of times (parameter to be specified), as well as an image of each CM.

2. The elimination of false positives of the reflection type or related to a perspective effect (which will, at a certain moment, be seen at a location on the grid but which will no longer be seen when the same location on the grid is looked at from another angle of view, later).

For this purpose, it is sufficient to give, for each detection, its "visibility rate" when the corresponding area is on the screen (a CM should have such a very high rate, and a false positive should have a low rate).

3. The counting of "different" detections (in the sense of their location on the grid), and the possibility of differentiating them, via a different color for each "object" different in their representation, both on the video and in the time progress bar, as well as via "checkmarks" in the interface allowing to hide or display each detection.

4. Have a position reference for the CM removal operation.

5. Have a reference of the position of the CM for the search/confrontation on previous ITVs of the same assembly (to check if the CM was already there).

ITV Automation:

In an even more prospective version of the tool, artificial intelligence (based on the same archive videos) could learn to handle the camera itself to search for migrating bodies by capturing the videos itself and deciding for example itself to examine its suspicions of CM more closely.

Applications/User Benefits:

The process according to the invention can be implemented in each of the 3 CM detection steps.

Thus, the tool can be offered to each of the three operators or only to a subset. Thus, for example, it is possible to not only give it to the operator who does the live inspection, but just to the "proofreaders", so as not to risk a drop in vigilance paradoxically due to the assistance).

In a version where the three steps are implemented via the process according to the invention, the assistance can be used from the first step during the initial image taking, that is to say "live" (therefore either with a machine powerful enough to use mode A described above, or the use of mode B described above).

The operator can generate his report automatically (with the screenshots he considers interesting) via the appropriate functionality. He can then provide the video and the generated detection file as input of the second step, for independent analysis (meaning he does not provide the report).

During this second independent analysis step, the tool can be used in mode C (no detection via the algorithm, but simple rereading of the detection file previously generated) and the operator can also generate his report automatically. He will also have the possibility to edit the detection file and will be able to delete detections, by selecting them on the screen individually or by selecting an interval in the time bar.

He can also add them by hand, via the manual addition function (he pauses the video and draws the square on the screen).

Finally, the video, the detection file possibly enriched by editing it during the second step, and the two reports generated are given to the operator responsible for the final review and the doubt removal in the event of a suspicion of CM.

The doubt removal in the event of a suspicion of CM is on the critical path to unit shutdown, so that any time saving at this step is a direct monetary gain.

A fuel assembly is very expensive and failure to detect a migrating body can damage it and render it unusable.

A migrating body can possibly, via various means, cause a piercing of the sheath of a rod and cause a loss of the first safety barrier, with diffusion of fission products in the primary circuit.

On the archived videos from different sites, the migrating bodies) missed by the method according to the current state of the art using three operators could be detected by the process according to the invention which directly indicated at which moments of the video to be watched which, on the one hand increases the reliability of the CM search and, on the other hand, greatly limits the duration of viewing the operators, in particular for the last operator in its role of removing doubt.

The solution according to the invention allows to partly overcome the disadvantages associated with human fatigue when faced with such a task, which inevitably leads to forgetting.

The invention claimed is:

1. A process for aiding the detection of migrating bodies within a fuel assembly of a nuclear power plant and more particularly on an anti-debris grid of a lower end piece of the fuel assembly, the fuel assembly being immersed in a cooling pool, and the camera being fixed at a bottom of the pool and facing the lower end piece, during which at least one camera is controlled in the direction of the fuel assembly and the stream of video images recorded by the at least one camera is directed towards a man-machine interface which comprises at least one screen allowing a first operator to view said stream of video images, wherein the process comprises a first step of detecting, using an image recognition algorithm, the migrating bodies, and a second step of alerting the first operator if the image recognition algorithm has detected the potential presence of at least one migrating body.

2. The process according to claim 1, wherein the second step comprises the triggering of an audible alert and/or a visual alert on the screen, of the location where the migrating body is potentially placed, and/or the automatic generation of an inspection report.

3. The process according to claim 2, wherein, when the image recognition algorithm has detected the potential presence of at least one migrating body within video images of the stream of video images:

a file of detection indicating said migrating body is generated, a video file corresponding to the video images and the file of detection are stored; and the file of detection is addressed to a second operator with a temporal indication, in the video file, of the instants at which the image recognition algorithm detected the potential presence of at least one migrating body, the second operator validating the presence or lack of presence of at least one migrating body.

4. The process according to claim 3, wherein the file of detection is transmitted to a third operator who definitively validates the presence or lack of presence of at least one migrating body.

5. The process according to claim 3, wherein said process comprises an automatic learning step for detecting migrating bodies when the second operator has validated the lack of presence of a migrating body.

6. The process according to claim 3, wherein use is made of a "convolutional neural network" image recognition software, which is trained on a learning base made up of archives of videos of migrating bodies, the learning base being enriched each time the "convolutional neural network" image recognition software commits a detection error, this detection error having been validated by the second and/or the third operator.

7. The process according to claim 3, wherein the temporal indication has the shape of at least one bar displayed on a timeline of the video file.

8. The process according to claim 4, further comprising an automatic learning step for detecting migrating bodies when the third operator has validated the lack of presence of at least one migrating body.

* * * * *

14